(12) United States Patent
Wigen et al.

(10) Patent No.: US 11,731,198 B2
(45) Date of Patent: Aug. 22, 2023

(54) ADDITIVE MANUFACTURING SYSTEM INCLUDING AN OPTICAL ISOLATOR

(71) Applicant: Rosemount Aerospace Inc., Burnsville, MN (US)

(72) Inventors: Scott Wigen, Eagan, MN (US); Rudy Pitera, Woodbury, MN (US); Ryan P. Chou, Bloomington, MN (US); Greg A. Seidel, Farmington, MN (US); Kent A. Ramthun, Snakopee, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 503 days.

(21) Appl. No.: 16/545,649

(22) Filed: Aug. 20, 2019

(65) Prior Publication Data

US 2021/0053118 A1 Feb. 25, 2021

(51) Int. Cl.
| *B22F 12/40* | (2021.01) |
| *B29C 64/153* | (2017.01) |
| *B29C 64/268* | (2017.01) |
| *B33Y 30/00* | (2015.01) |
| *B29C 64/286* | (2017.01) |

(Continued)

(52) U.S. Cl.
CPC .............. *B22F 10/00* (2021.01); *B22F 12/40* (2021.01); *B23K 26/0643* (2013.01); *B29C 64/153* (2017.08); *B29C 64/268* (2017.08); *H01S 3/0064* (2013.01); *B22F 2301/10* (2013.01); *B22F 2301/255* (2013.01); *B29C 64/286* (2017.08); *B33Y 10/00* (2014.12); *B33Y 30/00* (2014.12)

(58) Field of Classification Search
CPC ...... B22F 10/00; B22F 12/40; B22F 2301/10; B22F 2301/255; B23K 26/0643; H01S 3/0064; B33Y 10/00; B33Y 30/00; B29C 64/153; B29C 64/268; B29C 64/286
USPC ....................................................... 425/174.4
See application file for complete search history.

(56) References Cited

U.S. PATENT DOCUMENTS

| 5,726,801 A | 3/1998 | Pan |
| 9,001,172 B2 | 4/2015 | Ghauri |

(Continued)

FOREIGN PATENT DOCUMENTS

| JP | 2010070841 A | * 4/2010 | ............ B22F 1/0022 |
| WO | 10026397 A1 | 3/2010 | |
| WO | 16185354 A1 | 11/2016 | |

OTHER PUBLICATIONS

English Translation for JP 2010-70841; Title: Composite Metal Nanorod, Composite Metal Nanorod Containing Composition, And Polarization Material; Inventor Name: Matsunami Yuki; Document Year: Apr. 2, 2010 (Year: 2010).*

(Continued)

*Primary Examiner* — Seyed Masoud Malekzadeh
(74) *Attorney, Agent, or Firm* — Locke Lord LLP; Daniel J. Fiorello; Gabrielle L. Gelozin

(57) ABSTRACT

An additive manufacturing apparatus including an energy source configured for transmitting a laser, a build plate configured to have a powder configured to be heated by the laser for additive manufacturing, at least one mirror positioned between the energy source and the build plate, the at least one mirror configured to direct the laser from the energy source to the build plate, and an optical isolator configured to reduce energy bounce back into the energy source.

12 Claims, 1 Drawing Sheet

(51) Int. Cl.
    *B22F 10/00*    (2021.01)
    *B23K 26/06*    (2014.01)
    *H01S 3/00*    (2006.01)
    *B33Y 10/00*    (2015.01)

(56) References Cited

U.S. PATENT DOCUMENTS

| | | | |
|---|---|---|---|
| 9,073,150 B2 * | 7/2015 | Graichen | B23P 6/002 |
| 10,144,176 B1 * | 12/2018 | Buller | B33Y 70/00 |
| 10,583,482 B2 * | 3/2020 | Heugel | B22F 12/88 |
| 2011/0259862 A1 | 10/2011 | Scott et al. | |
| 2015/0343664 A1 * | 12/2015 | Liu | B28B 1/001 |
| | | | 419/1 |
| 2017/0050377 A1 | 2/2017 | Gelbart | |
| 2017/0090462 A1 * | 3/2017 | Dave | G01N 21/71 |
| 2017/0120337 A1 * | 5/2017 | Kanko | B33Y 10/00 |
| 2018/0136458 A1 * | 5/2018 | Plucinski | B33Y 30/00 |
| 2018/0207871 A1 * | 7/2018 | Miki | B29C 64/393 |
| 2019/0027888 A1 | 1/2019 | Durkin | |
| 2019/0176396 A1 * | 6/2019 | Bokkes | B33Y 30/00 |
| 2019/0176399 A1 * | 6/2019 | Hunze | B22F 12/49 |
| 2021/0008793 A1 * | 1/2021 | Pokrass | B29C 64/277 |
| 2021/0053280 A1 * | 2/2021 | DeMuth | B29C 64/245 |

OTHER PUBLICATIONS

Extended European Search Report dated Jul. 9, 2020, issued during the prosecution of European Patent Application No. EP 19214572.0.

* cited by examiner

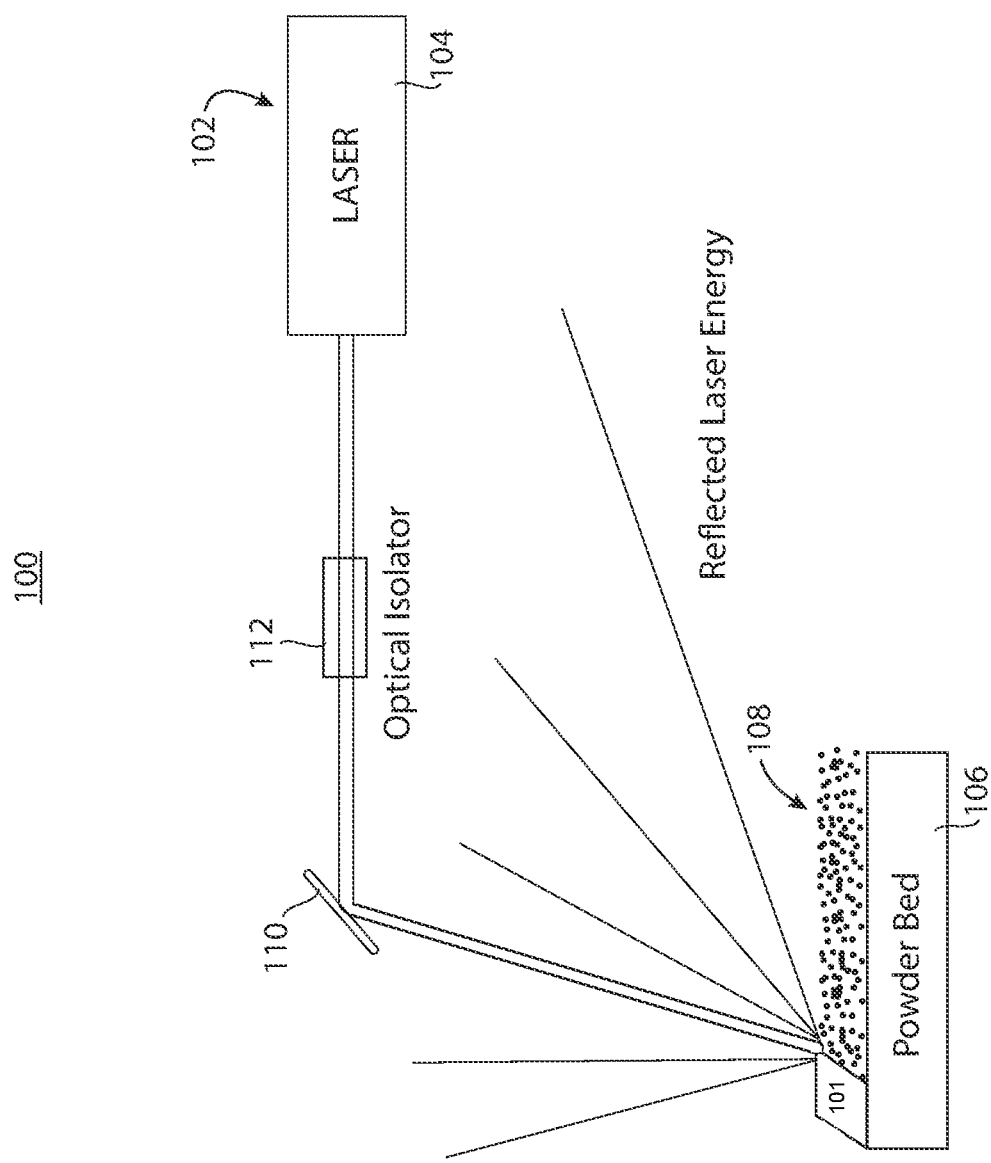

ADDITIVE MANUFACTURING SYSTEM INCLUDING AN OPTICAL ISOLATOR

BACKGROUND

Technological Field

The present disclosure relates to an additive manufacturing system, and more particularly to an additive manufacturing system including an optical isolator.

Description of Related Art

Additive manufacturing systems employ lasers in order to sinter the powder within powder beds. The powders sometimes inadvertently reflect and bounce back into the optical path and damage the lasers. Lasers monitor for this damage and will shut off if back reflection above a certain threshold is sensed. However, back reflection issues can arise and shut down builds when printing materials are highly reflective at the wavelength of the laser, materials including copper, aluminum, etc.

The conventional methods and systems have generally been considered satisfactory for their intended purpose which primarily process less reflective materials. However, there is still a need in the art for additive manufacturing systems having improved systems for dealing with reflective materials. There also remains a need in the art for such systems and components that are economically viable. The present disclosure may provide a solution for at least one of these remaining challenges.

SUMMARY OF THE INVENTION

An additive manufacturing apparatus includes an energy source configured for transmitting a laser, a build plate configured to have a powder configured to be heated by the laser for additive manufacturing, at least one mirror positioned between the energy source and the build plate, the at least one mirror configured to direct the laser from the energy source to the build plate and an optical isolator configured to reduce energy bounce back into the energy source. The laser can emit from about 800 nm to about 2200 nm near-infrared wavelength. The build plate can include a powder of at least one of copper, silver, beryllium or other highly reflective metal. The optical isolator can be positioned between the powder build plate and the energy source. The at least one mirror can includes a polarization coating to reduce back reflections to the optical isolator. The laser can be a non-polarized or polarized laser.

A method for using the additive manufacturing apparatus is also considered. The method includes directing a laser from the energy source to the build plate containing an additive manufacturing media, and capturing a reflected portion of the laser using an optical isolator to reduce energy bounce back into the energy source. The method can include emitting the laser from the energy source, wherein the laser includes a near infrared wavelength and monitoring for any portion of the reflected portion of the laser entering the energy source and forming an additively manufactured part using the laser from the energy source.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 1 is a schematic view of an additive manufacturing apparatus.

DETAILED DESCRIPTION

Reference will now be made to the drawings wherein like reference numerals identify similar structural features or aspects of the subject invention. For purposes of explanation and illustration, and not limitation, a partial view of an exemplary embodiment of an additive manufacturing apparatus in accordance with the invention is shown in FIG. 1 and is designated generally by reference character 100. The methods and systems of the invention can be used to protect the additive manufacturing apparatus from laser reflection and to reduce manufacturing stoppages and downtime due to the reflections.

FIG. 1 shows, an additive manufacturing apparatus 100 forming an additively manufactured part 101 using a laser being transmitted from an energy source 102 outfitted with a laser transmitter 104, a build plate 106 having a powder 108, a mirror 110 positioned between the energy source 102 and the build plate 106 to direct the laser from the energy source 102 to the build plate 106. The energy source 102 is monitored for a reflected portion of the laser being reflected. The mirror includes a polarization coating that supports the optical isolator and further minimizes back reflections. The optical isolator 112 is positioned between the mirror 110 and the energy source 102. The optical isolator 112 can include metal components, glass components, crystal components and/or fiber optic components. The laser transmitter 104 may require the laser be linearly polarized, circularly polarized, or not polarized. Any type of optical isolator may be used dependent upon the system 100 defined by the equipment manufacturer for the additive manufacturing process. The optical isolator 112 reduces energy bounce back into the energy source 102.

When the powder includes copper, silver, beryllium or another similar highly reflective metal which reflects energy at approximately 800-2200 nm wavelength, the reflected energy can burn, overheat or even destroy the internal components of the laser transmitter 104, leading to a shutdown of the laser transmitter 104 if the energy enters the transmitter 104. Therefore the optical isolator, the build plate and the energy source, is configured to reduce energy bounce back into the energy source and configured to prevent shut down of the laser transmitter due to reflection of the laser off of the build plate.

The methods and systems of the present disclosure, as described above and shown in the drawings, provide for an additive manufacturing apparatus with superior properties including increased reliability and stability. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. An additive manufacturing apparatus, comprising:
   an energy source, outfitted with a laser transmitter, configured for transmitting a laser;
   a build plate configured to have a powder to be heated by the laser for additive manufacturing;
   at least one mirror positioned between the energy source and the build plate, the at least one mirror configured to direct the laser from the energy source to the build plate; and
   an optical isolator positioned between the build plate and the energy source configured to reduce energy bounce back into the energy source and configured to prevent shut down of the laser transmitter due to reflection of the laser off of the build plate.

2. The apparatus of claim 1, wherein the laser emits from about 800 nm to about 2200 nm near-infrared wavelength.

3. The apparatus of claim 1, wherein the build plate includes the powder disposed thereon of at least one of copper, silver, beryllium or other highly reflective metal.

4. The apparatus of claim 1, wherein the at least one mirror includes a polarization coating to reduce back reflections to the optical isolator.

5. The apparatus of claim 1, wherein the laser that the energy source is configured to transmit is a non-polarized laser.

6. The apparatus of claim 1, wherein the laser that the energy source is configured to transmit is a polarized laser.

7. An optical arrangement for an additive manufacturing system, comprising:
   at least one mirror positioned between an energy source outfitted with a laser transmitter, and a build plate of the additive manufacturing system, wherein the at least one mirror is configured to direct a laser beam transmitted from the energy source to the build plate configured to have a powder to be heated by the laser beam; and
   an optical isolator positioned between the build plate and the energy source configured to reduce energy bounce back into the energy source and configured to prevent shut down of the laser transmitter due to reflection of the laser off of the build plate.

8. The optical arrangement of claim 7, wherein the build plate includes the powder disposed thereon of at least one of copper, silver, beryllium or other highly reflective metal.

9. The optical arrangement of claim 7, wherein the at least one mirror includes a polarization coating to reduce back reflections to the optical isolator.

10. The optical arrangement of claim 7, wherein the energy source is configured to transmit is a non-polarized laser.

11. The optical arrangement of claim 7, wherein the energy source is configured to transmit is a polarized laser.

12. An additive manufacturing apparatus, comprising:
   an energy source, outfitted with a laser transmitter, configured for transmitting a laser;
   a build plate configured to have a powder configured to be heated by the laser for additive manufacturing;
   at least one mirror positioned between the energy source and the build plate, the at least one mirror configured to direct the laser from the energy source to the build plate; and
   an optical isolator, positioned between the build plate and the energy source, configured to reduce energy bounce back into the energy source and configured to prevent shut down of the laser transmitter due to reflection of the laser off of the build plate, wherein the optical isolator includes glass, crystal, and/or metal components.

* * * * *